United States Patent [19]
Smith et al.

[11] Patent Number: 5,921,157
[45] Date of Patent: Jul. 13, 1999

[54] DUAL-BAR LUG NUT REMOVING SYSTEM

[76] Inventors: Roger S. Smith; Marie Smith, both of 6100 Nub Hill Dr., New Castle, Calif. 95658

[21] Appl. No.: 08/839,959

[22] Filed: Apr. 27, 1997

[51] Int. Cl.[6] .................................................... B25B 13/00
[52] U.S. Cl. .......................... 81/58.1; 81/177.2; 81/177.5
[58] Field of Search .................................. 81/58.1, 177.2, 81/177.5, 124.4, 124.7, 125.1, 60–63.2, 462, 489

[56] References Cited

U.S. PATENT DOCUMENTS

| | | | |
|---|---|---|---|
| 1,404,881 | 1/1922 | Moore, Jr. ............................... | 81/125.1 |
| 2,891,434 | 6/1959 | Lozensky ................................. | 81/60 |
| 3,416,395 | 12/1968 | Hanson .................................. | 81/177.5 |
| 3,843,981 | 10/1974 | Verest .................................... | 81/177.2 |
| 4,149,820 | 4/1979 | Newlin ................................... | 81/60 |
| 4,581,958 | 4/1986 | Shull ...................................... | 81/177.2 |
| 4,762,031 | 8/1988 | Bradley ................................. | 81/180.1 |
| 4,991,468 | 2/1991 | Lee ......................................... | 81/60 |
| 5,245,721 | 9/1993 | Lowe et al. ............................ | 7/107 |
| 5,725,193 | 3/1998 | Adams . | |

FOREIGN PATENT DOCUMENTS 2823464  12/1979  Germany .............................. 81/177.2

*Primary Examiner*—David A. Scherbel
*Assistant Examiner*—Joni B. Danganan

[57] ABSTRACT

A new Dual-Bar Lug Nut Removing System for facilitating removal of lug nuts from a vehicle without the user exerting a tremendous amount of physical force, and of which can be easily disassembled and stored in a compact carrying case. The inventive device includes a ratchet-torque wrench, a first leverage tube which removably captures the ratchet handle of the ratchet-torque wrench, a second leverage tube removably secured to the ratchet-torque wrench orthogonally to the ratchet handle, and a carrying case which captures the above stated components.

7 Claims, 3 Drawing Sheets

DUAL-BAR LUG NUT REMOVING SYSTEM

BACKGROUND OF THE INVENTION

1. Field of the Invention

The present invention relates to Lug Wrench Devices and more particularly pertains to a new Dual-Bar Lug Nut Removing System for facilitating removal of lug nuts from a vehicle without the user exerting a tremendous amount of physical force, and of which can be easily disassembled and stored in a compact carrying case.

2. Description of the Prior Art

The use of Lug Wrench Devices is known in the prior art. More specifically, Lug Wrench Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Lug Wrench Devices include U.S. Pat. No. 4,733,583; U.S. Pat. No. 3,992,964; U.S. Pat. No. 5,337,638; U.S. Pat. No. 5,201,257; U.S. Pat. No. 4,691,599 and U.S. Pat. No. 3,889,490.

While these devices fulfill their respective, particular objectives and requirements, the aforementioned patents do not disclose a new Dual-Bar Lug Nut Removing System. The inventive device includes a ratchet-torque wrench, a first leverage tube which removably captures the ratchet handle of the ratchet-torque wrench, a second leverage tube removably secured to the ratchet-torque wrench orthogonally to the ratchet handle, and a carrying case which captures the above stated components.

In these respects, the Dual-Bar Lug Nut Removing System according to the present invention substantially departs from the conventional concepts and designs of the prior art, and in so doing provides an apparatus primarily developed for the purpose of facilitating removal of lug nuts from a vehicle without the user exerting a tremendous amount of physical force, and of which can be easily disassembled and stored in a compact carrying case.

SUMMARY OF THE INVENTION

In view of the foregoing disadvantages inherent in the known types of Lug Wrench Devices now present in the prior art, the present invention provides a new Dual-Bar Lug Nut Removing System construction wherein the same can be utilized for facilitating removal of lug nuts from a vehicle without the user exerting a tremendous amount of physical force, and of which can be easily disassembled and stored in a compact carrying case.

The general purpose of the present invention, which will be described subsequently in greater detail, is to provide a new Dual-Bar Lug Nut Removing System apparatus and method which has many of the advantages of the Lug Wrench Devices mentioned heretofore and many novel features that result in a new Dual-Bar Lug Nut Removing System which is not anticipated, rendered obvious, suggested, or even implied by any of the prior art Lug Wrench Devices, either alone or in any combination thereof.

To attain this, the present invention generally comprises a ratchet-torque wrench, a first leverage tube which removably captures the ratchet handle of the ratchet-torque wrench, a second leverage tube removably secured to the ratchet-torque wrench orthogonally to the ratchet handle, and a carrying case which captures the above stated components.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Dual-Bar Lug Nut Removing System apparatus and method which has many of the advantages of the Lug Wrench Devices mentioned heretofore and many novel features that result in a new Dual-Bar Lug Nut Removing System which is not anticipated, rendered obvious, suggested, or even implied by any of the prior art Lug Wrench Devices, either alone or in any combination thereof.

It is another object of the present invention to provide a new Dual-Bar Lug Nut Removing System which may be easily and efficiently manufactured and marketed.

It is a further object of the present invention to provide a new Dual-Bar Lug Nut Removing System which is of a durable and reliable construction.

An even further object of the present invention is to provide a new Dual-Bar Lug Nut Removing System which is susceptible of a low cost of manufacture with regard to both materials and labor, and which accordingly is then susceptible of low prices of sale to the consuming public, thereby making such Dual-Bar Lug Nut Removing System economically available to the buying public.

Still yet another object of the present invention is to provide a new Dual-Bar Lug Nut Removing System which provides in the apparatuses and methods of the prior art some of the advantages thereof, while simultaneously overcoming some of the disadvantages normally associated therewith.

Still another object of the present invention is to provide a new Dual-Bar Lug Nut Removing System for facilitating removal of lug nuts from a vehicle without the user exerting a tremendous amount of physical force, and of which can be easily disassembled and stored in a compact carrying case.

Yet another object of the present invention is to provide a new Dual-Bar Lug Nut Removing System which includes a ratchet-torque wrench, a first leverage tube which removably captures the ratchet handle of the ratchet-torque wrench, a second leverage tube removably secured to the ratchet-torque wrench orthogonally to the ratchet handle, and a carrying case which captures the above stated components.

Still yet another object of the present invention is to provide a new Dual-Bar Lug Nut Removing System where the ratchet-torque wrench is preset to 80 ft-lb. torque setting for tightening only.

Even still another object of the present invention is to provide a new Dual-Bar Lug Nut Removing System that is easier to use than conventional lug nut removing devices and which requires less time in removing the lug nuts from a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
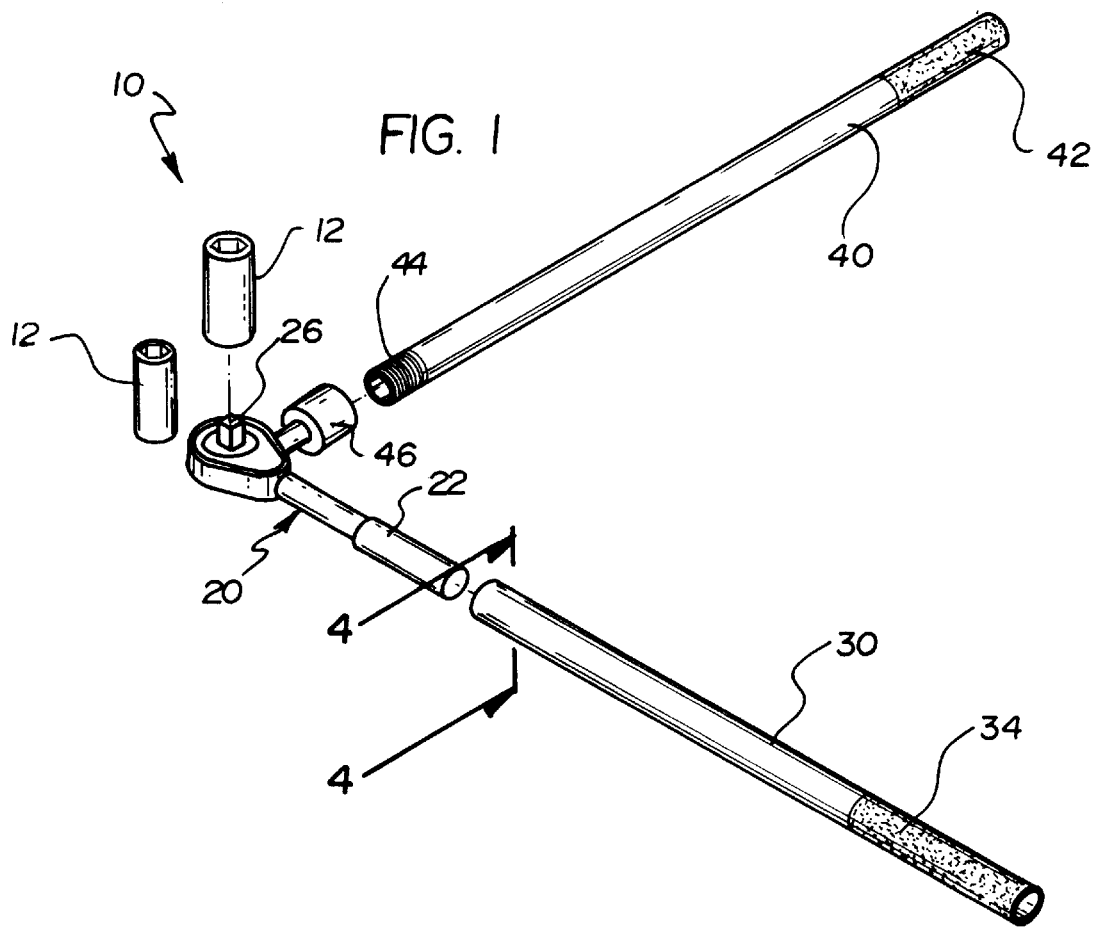
FIG. 1 is a side perspective view of a new Dual-Bar Lug Nut Removing System according to the present invention.
Figure 2:
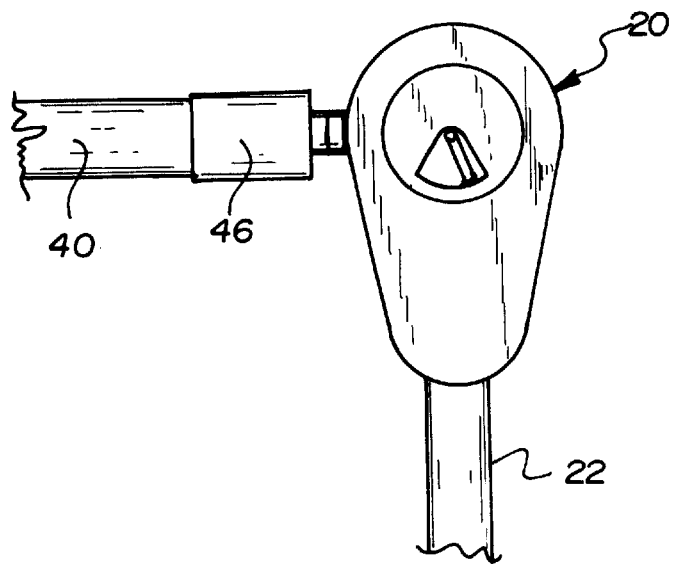
FIG. 2 is a view of the present invention disclosing the second leverage tube engaging the tube coupler which engages the ratchet-torque wrench.
Figure 3:
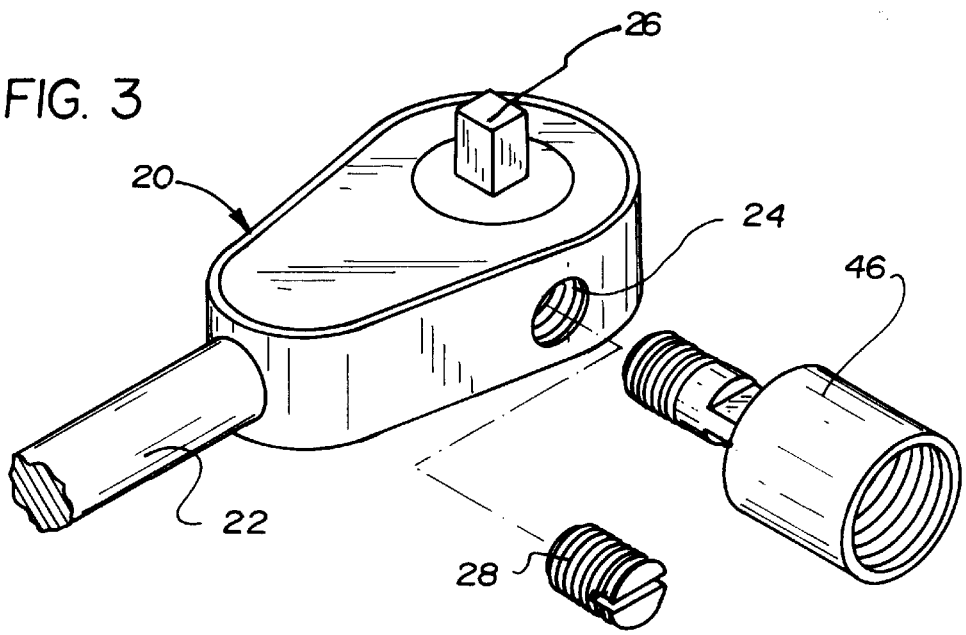
FIG. 3 is an exploded isometric illustration of the present invention.
Figure 4:
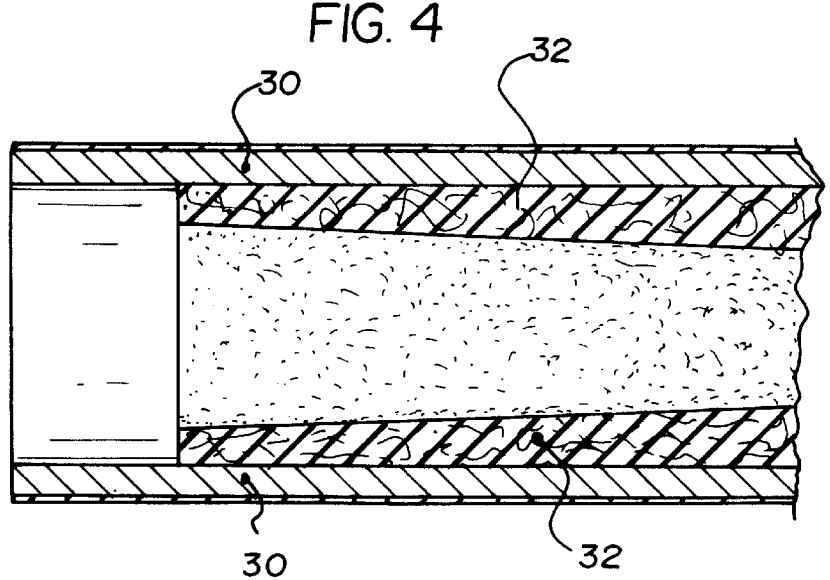
FIG. 4 is a cross sectional view taken along line 4—4 of FIG. 1 disclosing the angled foam secured within the interior portion of the first leverage bar.
Figure 5:
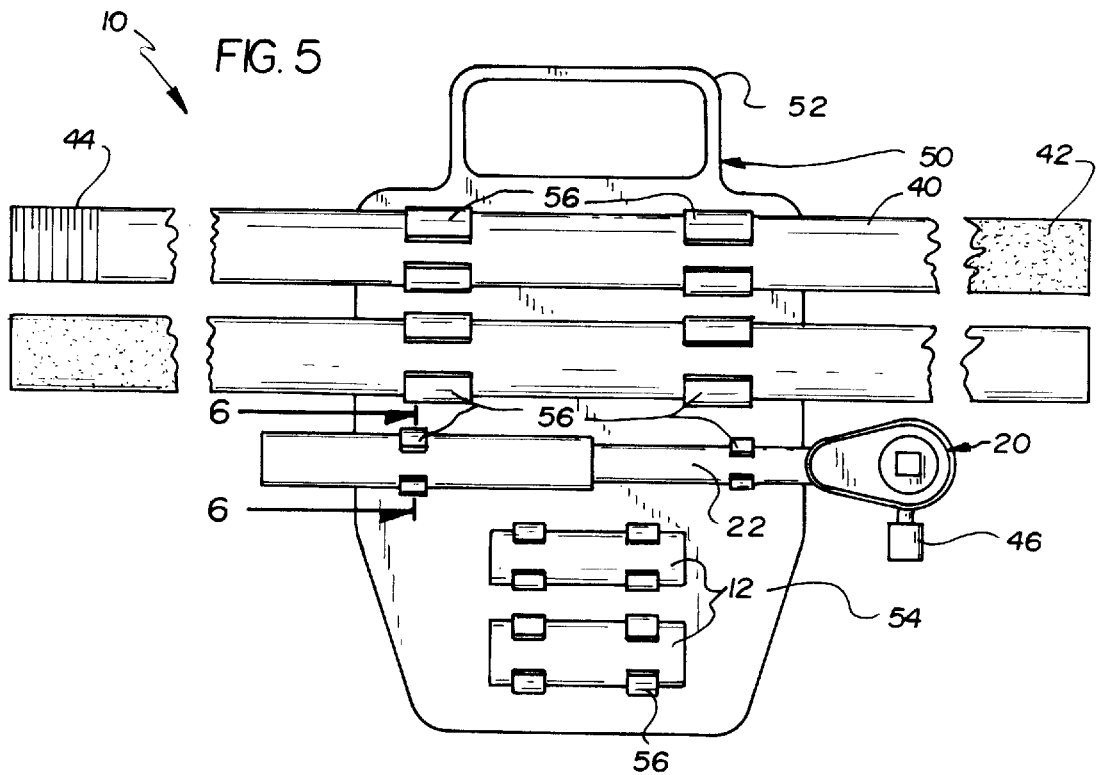
FIG. 5 is a top view of the present invention captured by the carrying case.
Figure 6:
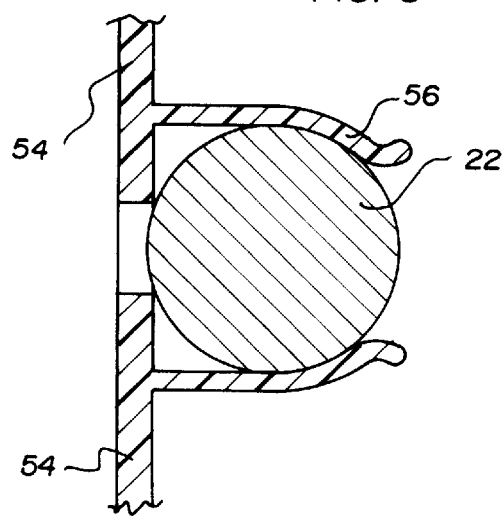
FIG. 6 is a cross sectional view taken along line 6—6 of FIG. 5 disclosing the U-shaped snapping clamps which capture the removable components of the present invention.

With reference now to the drawings, and in particular to FIGS. 1 through 6 thereof, a new Dual-Bar Lug Nut Removing System embodying the principles and concepts of the present invention and generally designated by the reference numeral 10 will be described.

More specifically, it will be noted that the Dual-Bar Lug Nut Removing System 10 comprises a ratchet-torque wrench 20, a first leverage tube 30 slidably secured over a ratchet handle 22 of the ratchet-torque wrench 20, a second leverage tube 40 removably secured to the ratchet-torque wrench 20 near a drive shaft 26 of the ratchet-torque wrench 20 orthogonal to the ratchet handle 22, and a carrying case 50 capturing the ratchet-torque wrench 20, the first leverage tube 30, the second leverage tube 40 and a plurality of conventional deep sockets 12. The ratchet handle 22 may be extended to an approximate length of eighteen inches long.

As best illustrated in FIGS. 1 through 6, it can be shown that the ratchet-torque wrench 20 includes a threaded aperture 24 opposite of the end of the ratchet handle 22 engaging the first leverage tube 30. The longitudinal axis of said threaded aperture 24 projects orthogonally to the longitudinal axis of the ratchet handle 22, and includes a threaded plug 28 which removably projects into the threaded aperture 24 as best disclosed in FIG. 3 of the drawings. The first leverage tube 30 includes an angled foam 32 secured interiorly near the end slidably projecting over the ratchet handle 22 as disclosed in FIG. 4 of the drawings. Said angled foam 32 forms a semi-conical structure, with the enlarged end near the end of the first leverage tube 30 which slidably projects over the ratchet handle 22. The second leverage tube 40 includes a tube coupler 46 which includes a threaded male end which removably projects in to the threaded aperture 24 and includes a threaded female end opposite of the threaded male end as best disclosed in FIG. 3 of the drawings. The tube coupler may be welded directly to the ratchet-torque wrench 20 in an alternative embodiment. A threaded end 44 projects into the threaded female end, resulting in the second leverage tube 40 positioned substantially orthogonal to the longitudinal axis of the ratchet handle 22. The carrying case 50 includes a holding plate 54. A handle 52 is secured to the upper edge of the holding plate 54. A plurality of U-shaped snapping clamps 56 are secured to the frontal surface of the holding plate 54 which capture the removable components of the present invention, positioning said removable components substantially parallel to one another. The first leverage tube 30 preferably includes a first rubber coating 34 near the end opposite of the end containing the angled foam 32 as disclosed in FIG. 4 of the drawings. The second leverage tube 40 preferably includes a second rubber coating 42 near the end opposite of the threaded end 44.

In use, the user slides the first leverage tube 30 over the ratchet handle 22. The user then rotatably engages the second leverage tube 40 to the threaded female end of the tube coupler 46 which is removably secured to the ratchet-torque wrench. The user then secures the conventional deep socket 12 to the drive shaft 26 and engages the conventional deep socket 12 to an unnumbered lug nut. The user then places his left hand on either the first or second leverage tubes 30 or 40, and places his other hand on the other leverage tube and applies torque which results in rotation of the unnumbered lug nut.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual-bar lug nut removing system comprising:

a ratchet-torque wrench;

a first leverage tube slidably secured over a ratchet handle of the ratchet-torque wrench;

a second leverage tube removably secured to the ratchet-torque wrench near a drive shaft of the ratchet-torque wrench orthogonal to the ratchet handle;

wherein the ratchet-torque wrench includes an aperture positioned away from an end of the ratchet handle engaging the first leverage tube:

wherein the second leverage tube includes a tube coupler which includes a male end which removably projects into the aperture of the ratchet-torque wrench and a female end opposite the male end, another end of the second leverage tube being projected into the female end of the tube coupler: and a carrying case capturing the ratchet-torque wrench, the first leverage tube, the second leverage tube and a plurality of conventional deep sockets.

2. The A dual-bar lug nut removing system of claim 1, wherein the aperture engaging the first leverage tube is threaded, where the longitudinal axis of said threaded aperture projects orthogonally to the longitudinal axis of the ratchet handle, and includes a threaded plug which removably projects into the threaded aperture.

3. The dual-bar lug nut removing system of claim 2, wherein the first leverage tube includes an angled foam secured interiorly near the end slidably projecting over the ratchet handle, where said angled foam forms a semi-conical structure being tapered together from the end of the first leverage tube which slidably projects over the ratchet handle towards an opposite end thereof.

4. A dual-bar lug nut removing system comprising:

a ratchet-torque wrench;

a first leverage tube slidably secured over a ratchet handle of the ratchet-torque wrench;

a second leverage tube removably secured to the ratchet-torque wrench near a drive shaft of the ratchet-torque wrench orthogonal to the ratchet handle;

a carrying case capturing the ratchet-torque wrench, the first leverage tube, the second leverage tube and a plurality of conventional deep sockets:

wherein the ratchet-torque wrench includes a threaded aperture opposite of the end of the ratchet handle engaging the first leverage tube, where the longitudinal axis of said threaded aperture projects orthogonally to the longitudinal axis of the ratchet handle, and includes a threaded plug which removably projects into the threaded aperture;

wherein the first leverage tube includes an angled foam secured interiorly near the end slidably projecting over the ratchet handle, where said angled foam forms a semi-conical structure being tapered together from the end of the first leverage tube which slidably projects over the ratchet handle towards an opposite end thereof;

wherein the second leverage tube includes:

a tube coupler which includes a threaded male end which removably projects in to the threaded aperture and includes a threaded female end opposite of the threaded male end; and a threaded end which projects into the threaded female end, resulting in the second leverage tube positioned substantially orthogonal to the longitudinal axis of the ratchet handle.

5. The dual-bar lug nut removing system of claim 4, wherein the carrying case includes:

a holding plate;

a handle secured to the upper edge of the holding plate; and a plurality of U-shaped snapping clamps for capturing the ratchet-torque wrench and the first and second leverage tubes.

6. The dual-bar lug nut removing system of claim 5, wherein the first leverage tube includes a first rubber coating near the end opposite of the end containing the angled foam.

7. The dual-bar lug nut removing system of claim 6, wherein the second leverage tube includes a second rubber coating near the end opposite of the threaded end.

* * * * *